US012691595B2

(12) United States Patent　　　　　(10) Patent No.:　US 12,691,595 B2
Krumbacher et al.　　　　　　　　　　(45) Date of Patent:　　　Jul. 28, 2026

(54) ROBOT ARM

(71) Applicant: KUKA Deutschland GmbH, Augsburg (DE)

(72) Inventors: Rainer Krumbacher, Rettenbach am Auerberg (DE); Leander Stefan Eisenwinter, Buttenwiesen-Lauterbach (DE); Oliver Klaffenbach, Augsburg (DE); Jan Freiburger, Augsburg (DE)

(73) Assignee: KUKA Deutschland GmbH (DE)

( * ) Notice: Subject to any disclaimer, the term of this patent is extended or adjusted under 35 U.S.C. 154(b) by 64 days.

(21) Appl. No.: 18/847,744

(22) PCT Filed: Mar. 17, 2022

(86) PCT No.: PCT/EP2022/057065
§ 371 (c)(1),
(2) Date: Sep. 17, 2024

(87) PCT Pub. No.: WO2023/174548
PCT Pub. Date: Sep. 21, 2023

(65) Prior Publication Data
US 2025/0196372 A1　　　Jun. 19, 2025

(51) Int. Cl.
*B25J 18/00*　　　(2006.01)
*B25J 9/04*　　　(2006.01)
(Continued)

(52) U.S. Cl.
CPC ............... *B25J 18/04* (2013.01); *B25J 9/047* (2013.01); *B25J 9/108* (2013.01); *B25J 17/00* (2013.01)

(58) Field of Classification Search
CPC ... B25J 18/04; B25J 9/047; B25J 9/108; B25J 17/00
See application file for complete search history.

(56) References Cited

U.S. PATENT DOCUMENTS 5,375,480 A　　12/1994　Nihei et al.
2004/0123353 A1*　6/2004　Fischer .............. B23K 26/0884
901/30
(Continued)

FOREIGN PATENT DOCUMENTS

DE　　102018107142 A1　　9/2019
EP　　　　3189946 A1　　7/2017
(Continued)

OTHER PUBLICATIONS

European Patent Office; Search Report in related International Patent Application No. PCT/EP2022/057065 dated Nov. 17, 2022; 5 pages.

*Primary Examiner* — Truc M Do
(74) *Attorney, Agent, or Firm* — Dorton & Willis, LLP

(57)　　　　　ABSTRACT

A robot arm includes a plurality of configuration joints which determine the configuration of the robot arm; a base stand; a carousel mounted on the base stand for rotation about a first axis by a first joint of the configuration joints; a link arm mounted on the carousel pivot about a second axis of rotation by a second joint; and an arm boom pivotably mounted on the link arm about a third axis a third joint. The link arm has two mechanically separate pivot coupling rods designed for positioning the third joint in the working space of the robot arm. The first pivot coupling rod is pivotably mounted on the carousel by a first base bearing and the arm boom is mounted on the first pivot coupling rod by a first top bearing. The second pivot coupling rod is pivotably mounted on the carousel by a second base bearing and the arm boom is mounted on the second pivot coupling rod by a second top bearing. The two pivot coupling rods are pivotably driven by a common drive apparatus of the robot arm, which divides among the pivot coupling rods the drive energy to be guided via the link arm for positioning the third joint in the working (Continued)

space, in order to move the arm boom relative to the carousel.

13 Claims, 8 Drawing Sheets

(51) Int. Cl.
  *B25J 9/10* (2006.01)
  *B25J 17/00* (2006.01)
  *B25J 18/04* (2006.01)

(56) References Cited

U.S. PATENT DOCUMENTS

| | | | |
|---|---|---|---|
| 2008/0223170 A1* | 9/2008 | Tealdi | B25J 18/005 |
| | | | 901/29 |
| 2010/0162845 A1* | 7/2010 | Yonehara | B25J 9/06 |
| | | | 901/22 |
| 2017/0021507 A1* | 1/2017 | Jackson | B25J 17/0275 |
| 2019/0001501 A1* | 1/2019 | Roberts | B25J 13/088 |
| 2019/0126466 A1* | 5/2019 | Owa | B25J 9/04 |
| 2020/0324416 A1* | 10/2020 | Collmer | B05B 13/0431 |
| 2020/0331151 A1* | 10/2020 | Zasche | B25J 9/102 |

FOREIGN PATENT DOCUMENTS

| | | | |
|---|---|---|---|
| JP | 2009113188 A | 5/2009 | |
| WO | 2013104417 A1 | 7/2013 | |

* cited by examiner

ROBOT ARM

CROSS-REFERENCE TO RELATED APPLICATIONS

This application is a national phase application under 35 U.S.C. § 371 of International Patent Application No. PCT/EP2022/057065, filed Mar. 17, 2022 (pending), the disclosure of which is incorporated by reference herein in its entirety.

TECHNICAL FIELD

The invention relates to a robot arm comprising a plurality of configuration joints determining the configuration of the robot arm, a base frame, a carousel rotatably mounted on the base frame by means of a first joint of the configuration joints about a first axis of rotation, a link arm pivotably mounted on the carousel by means of a second joint of the configuration joints about a second axis of rotation, and an arm boom pivotably mounted on the link arm by means of a third joint of the configuration joints about a third axis of rotation.

BACKGROUND

EP 3 189 946 A1 describes an industrial robot having a frame, a carousel which is rotatable with respect to the frame around a first axis, a link arm which is pivotable with respect to the carousel around a second axis, and an upper arm which is rotatable with respect to the link arm around a third axis. The link arm comprises a first branch and a second branch. There is a first bearing arrangement between the carousel and the first branch, a second bearing arrangement between the first branch and the upper arm, a third bearing arrangement between the carousel and the second branch, and a fourth bearing arrangement between the second branch and the upper arm. The robot is configured to be fully functional without the second branch, although the precision of the robot is improved when the second branch is present. The second branch is therefore optional and the precision of the robot can be improved if required, while the existing bearing arrangements of the robot remain intact.

SUMMARY

The object of the invention is to create a robot arm with improved dynamic properties.

The object is achieved by a robot arm comprising a plurality of configuration joints determining the configuration of the robot arm, a base frame, a carousel mounted on the base frame such that it can rotate around a first axis of rotation by means of a first joint of the configuration joints, a link arm mounted on the carousel such that it can pivot around a second axis of rotation by means of a second joint of the configuration joints, and an arm boom mounted on the link arm such that it can pivot around a third axis of rotation by means of a third joint of the configuration joints, Wherein the link arm comprises two mechanically separate pivot coupling rods designed to position the third joint in the working space of the robot arm, wherein the first pivot coupling rod is pivotably mounted on the carousel by means of a first base bearing and the arm boom is mounted on the first pivot coupling rod by means of a first head bearing, and the second pivot coupling rod is pivotably mounted on the carousel by means of a second base bearing and the arm boom is mounted on the second pivot coupling rod by means of a second head bearing, and the two pivot coupling rods are pivotably driven by a common drive apparatus of the robot arm, which common drive apparatus distributes the drive energy to be conducted via the link arm for positioning the third joint in the working space to the two pivot coupling rods in order to adjust the arm boom relative to the carousel.

The robot arm can be arranged stationary on a base or movable, for example on a carriage of a linear axis, by means of its base frame. The carousel is mounted on the base frame in such a manner that it can rotate around the first axis of rotation of the robot arm. The first axis of rotation can, for example, extend vertically when the robot arm is positioned on a base. In such an arrangement, the second axis, around which the link arm is pivotably mounted on the carousel, can extend horizontally.

In this respect, the number of configuration joints of the robot arm corresponds to the number of degrees of freedom comprising the robot arm. In a common design configuration of the robot arm as a six-axis kick-arm robot, the number of degrees of freedom would therefore be six, and thus the six-axis kick-arm robot also has a total of exactly six configuration joints. In this respect, each configuration joint defines an axis of the robot arm, in particular an axis of rotation of the robot arm, which moves, i.e., adjusts, the downstream links and joints in the kinematic chain of axis or degrees of freedom of the robot arm in the distal direction. However, each configuration joint can be realized constructively by means of a single spherical plain bearing or, if necessary, each individual configuration joint can also be realized with two or more spherical plain bearings, which must then, however, be located on a common (rotary) axis in relation to the individual configuration joint.

The link arm is the link of the robot arm that mechanically connects the second joint in the kinematic chain of the robot arm to the third joint in the kinematic chain of the robot arm. Accordingly, the link arm defines the relative position and orientation of the second axis of rotation, which is determined by the second joint, with respect to the third axis of rotation, which is determined by the third joint.

In the context of the present invention, the link arm is understood to be the mechanical coupling link which transmits drive forces and drive torques for moving the arm boom and absorbs load forces and load torques which are to be supported by the robot arm due to the dead weight of the arm boom and a further load attached to the arm boom. The further load can in particular be a tool attached to the flange of the robot arm, such as a gripper, and possibly an object gripped by the gripper, and/or an energy supply device guided or mounted along the arm boom.

In this respect, the two pivot coupling rods according to the invention form a pair of coupling rods which, taken together, form the mechanical coupling link of the robot arm which connects the second configuration joint to the third configuration joint. The two pivot coupling rods are therefore designed and set up to transmit the drive forces and drive torques for moving the arm boom and to absorb load forces and load torques that are to be supported by the robot arm due to the dead weight of the arm boom and a further load attached to the arm boom. The drive energy required for this is conducted via both the first pivot coupling rod and the second pivot coupling rod.

The first pivot coupling rod and the second pivot coupling rod are designed independently of one another. This means that the drive energy introduced into the first pivot coupling rod cannot be passed on via the second pivot coupling rod and, conversely, the drive energy introduced into the second pivot coupling rod cannot be passed on via the first pivot coupling rod. Accordingly, the first pivot coupling rod and the second pivot coupling rod do not comprise a direct mechanical connection area, in particular no direct rigid connecting links. Accordingly, the first pivot coupling rod and the second pivot coupling rod are not designed in one piece, but are always mechanically separate from one another, in particular in two pieces.

In particular, the first pivot coupling rod and the second pivot coupling rod can be designed to transmit drive forces and drive torques of the same or at least approximately the same magnitude. In particular, the first pivot coupling rod and the second pivot coupling rod can have an identical and/or mirror-symmetrical design.

The first base bearing and the second base bearing are rotary bearings whose two axis of rotation are aligned with one another. Accordingly, the first pivot coupling rod and the second pivot coupling rod pivot around a common axis of rotation of the two base bearings relative to the carousel.

The first head bearing and the second head bearing are rotary bearings whose two axis of rotation are aligned with one another. Accordingly, the arm boom pivots around a common axis of rotation of the two head bearings of the pivot coupling rods relative to the two pivot coupling rods.

The common drive apparatus for automatically pivoting the two pivot coupling rods may comprise one or more gear units. The one gear unit or the multiple gear units can either be driven by a single motor or alternatively driven by two or more motors. Irrespective of whether the common drive apparatus comprises one gear unit or several gear units and/or the common drive apparatus comprises one motor or several motors, the common drive apparatus must be designed and set up in such a manner that it transmits drive energy to both the first pivot coupling rod and the second pivot coupling rod simultaneously. The total drive energy to be transmitted can be divided equally between the first pivot coupling rod and the second pivot coupling rod, i.e., 50% each. However, the total drive energy to be transmitted can also be divided between the first pivot coupling rod and the second pivot coupling rod in different parts if necessary. If several gear units are provided, they can be coupled by means of gearing, in particular by means of a suitable toothing. Alternatively or additionally, several motors can be provided, but these can then be coupled in terms of control technology, especially if the several gear units are not coupled to one another in terms of transmission technology. In this respect, the multiple gear units can also be coupled via multiple associated motors for control purposes only.

The arm boom can be pivotably driven by a further drive apparatus of the robot arm on the link arm, which further drive apparatus transmits its drive energy for positioning the arm boom to the arm boom in order to adjust the arm boom relative to the link arm.

The arm boom can therefore be driven for its pivoting movement relative to the link arm in an analogous technical manner, such as is provided for driving the two pivot coupling rods according to the invention, in order to move the link arm in a driven manner relative to the carousel.

Accordingly, the further drive apparatus for automatically pivoting the arm boom can also comprise one or more gear units. The one gear unit or the multiple gear units can either be driven by a single motor or alternatively driven by two or more motors. Regardless of whether the common drive apparatus comprises one gear unit or several gear units and/or the common drive apparatus comprises one motor or several motors, the further drive apparatus must be designed and set up in such a manner that it transmits drive energy to the arm boom. The total drive energy to be transmitted can be provided in equal parts, i.e., divided into 50% each on two separate gear units and/or motors and combined on the arm boom. However, the total drive energy to be transmitted can also be provided in different parts on two separate gear units and/or motors and combined on the arm boom. The respective individual gear unit and/or the individual motor of each two is then supported against either the first pivot coupling rod or the second pivot coupling rod.

If several gear units are provided, they can be coupled by means of gearing, in particular by means of a suitable toothing. Alternatively or additionally, several motors can be provided, but these can then be coupled in terms of control technology, especially if the several gear units are not coupled to one another in terms of transmission technology. In this respect, the multiple gear units can also be coupled via multiple associated motors for control purposes only.

The common drive apparatus can comprise a first gear unit, which is designed to transmit part of the drive energy to the first pivot coupling rod, and a second gear unit, which is independent of the first gear unit and is designed to transmit part of the drive energy to the second pivot coupling rod, and/or the further drive apparatus can comprise a first pivot head gear unit, which is designed to transmit part of the drive energy to the arm boom, wherein the first pivot head gear unit comprises a first torque support acting against the first pivot coupling rod, and can comprise a second pivot head gear unit which is designed to transmit part of the drive energy to the arm boom, wherein the second pivot head gear unit comprises a second torque support acting against the second pivot coupling rod.

Accordingly, the first pivot head gear unit can comprise a first gear housing into which a first input shaft leads and a first output shaft leads out, wherein the first housing of the first pivot head gear unit is mounted or flange-mounted on the pivot head of the first pivot coupling rod. A first motor can be connected to the first input shaft or the first input shaft can be formed by a first motor shaft of a first motor. The arm boom is coupled to the first output shaft.

Accordingly, the second pivot head gear unit can comprise a second gear housing into which a second input shaft leads and a second output shaft leads out, wherein the second housing of the second pivot head gear unit is mounted or flange-mounted on the pivot head of the second pivot coupling rod. A second motor can be connected to the second input shaft or the second input shaft can be formed by a second motor shaft of a second motor. The arm boom is also coupled to the second output shaft. Instead of a first motor and a second motor, a single common motor can also be provided, which introduces drive energy or a respective (partial) torque into both the first pivot head gear unit and the second pivot head gear unit via a gearbox junction.

In the case of the common drive apparatus, the first gear unit and the second gear unit can be coupled, in particular the first gear unit and the second gear unit can be mechanically coupled by means of at least one intermediate gear stage. In a simple embodiment, the inter-gear stage can be formed only by a shaft which couples the first gear unit and the second gear unit, in particular without the inter-gear stage comprising a low-speed gear ratio or a high-speed gear ratio.

In the case of the further drive apparatus, the first pivot head gear unit and the second pivot head gear unit can also be coupled as an alternative or as a supplement; in particular, the first pivot head gear unit and the second pivot head gear unit can be mechanically coupled by means of at least one pivot head inter-gear stage. In a simple embodiment, the pivot head inter-gear stage can be formed only by a shaft coupling the first pivot head gear unit and the second pivot head gear unit, in particular without the pivot head inter-gear stage comprising a low-speed gear ratio or a high-speed gear ratio.

In the case of the common drive apparatus, the common drive apparatus, or in particular the first gear unit and the second gear unit, can be driven by a common motor. Accordingly, the common motor can feed its drive torque into both gear units.

In the case of the further drive apparatus, the further drive apparatus can alternatively or additionally be driven by a common motor, or in particular the first pivot head gear unit and the second pivot head gear unit can be driven by a common motor. Accordingly, the common motor can feed its drive torque into both pivot head gear units.

In the case of the common drive apparatus, as an alternative to a single motor, the common drive apparatus can be driven by two separate motors, in particular the first gear unit can be driven by a first motor and the second gear unit can be driven by a second motor.

In the case of the further drive apparatus, as an alternative to a single motor, the further drive apparatus can also be driven by two separate motors, in particular the first pivot head gear unit can be driven by a first motor and the second pivot head gear unit can be driven by a second motor.

The two motors of the common drive apparatus can be actuated in a control-coupled manner, in particular the first motor of the first gear unit and the second motor of the second gear unit can be actuated in a control-coupled manner, and/or the two motors of the further drive apparatus can be actuated in a control-coupled manner, in particular the first motor of the first pivot head gear unit and the second motor of the second pivot head gear unit can be actuated in a control-coupled manner.

The two motors or the first motor and the second motor can be controlled in a coupled manner such that each motor provides 50% of the total drive energy. In the case of the motors for pivotally driving the pivot arm, however, the total drive energy to be transmitted can also be distributed in different parts to the first pivot coupling rod and the second pivot coupling rod, wherein each motor then provides a proportion of the drive energy to be transmitted that differs from 50% of the total drive energy.

In the case of the motors for pivoting drive of the arm boom, the total drive energy to be transmitted can be provided in equal parts, i.e., divided into 50% each by the two motors and combined at the arm boom. However, the total drive energy to be transmitted can also be provided in different parts by the two motors and combined at the arm boom.

In the case of the common drive apparatus, the common drive apparatus, or in particular the first gear unit and the second gear unit, may comprise at least one gearbox pre-stage, in particular at least one bevel gearbox pre-stage.

In the case of the further drive apparatus, the further drive apparatus, or in particular the first pivot head gear unit and the second pivot head gear unit, may comprise at least one gearbox pre-stage, in particular at least one bevel gearbox pre-stage.

The respective gearbox pre-stage, in particular the at least one bevel gearbox pre-stage of the common drive apparatus and/or the further drive apparatus, may comprise a high-speed transmission or a low-speed transmission.

A first weight balancing device of the robot arm can be assigned to the first pivot coupling rod and a second weight balancing device of the robot arm, separate from the first weight balancing device, can be assigned to the second pivot coupling rod.

For this purpose, the first pivot coupling rod can comprise at least one first bearing eye in the vicinity of its first base bearing for coupling a front bearing head of the first weight balancing device. In the same manner, the second pivot coupling rod can comprise at least one second bearing eye in the vicinity of its second base bearing for coupling a front bearing head of the second weight balancing device. The rear bearing head of the first weight balancing device and the rear bearing head of the second weight balancing device are coupled to further bearing eyes of the carousel or are supported on these further bearing eyes of the carousel. The first weight balancing device and the second weight balancing device can be designed identically.

A robot cable set can be routed along the first pivot coupling rod and an energy supply line can be routed along the second pivot coupling rod.

The robot cable set comprises electrical cables for supplying electrical power to the electric motors of the robot arm for automatically controlling the configuration joints of the robot arm, as well as associated electrical signal cables for controlling the electric motors of the robot arm for automatically controlling the configuration joints of the robot arm. In particular, the robot cable set can be guided along in an inner cavity of the first pivot coupling rod.

The energy supply line can comprise electrical lines, hydraulic lines, pneumatic lines and/or cooling water lines that are required to supply power to tools that are mounted on the tool flange of the robot arm, depending on the application. In particular, the energy supply line can be routed along the outside of the second pivot coupling rod or, alternatively, along the inside of the second pivot coupling rod.

Specific embodiments of the invention are explained in more detail in the following description with reference to the accompanying drawings. Specific features of these embodiments, possibly considered individually or in further combinations, can represent general features of the invention, regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
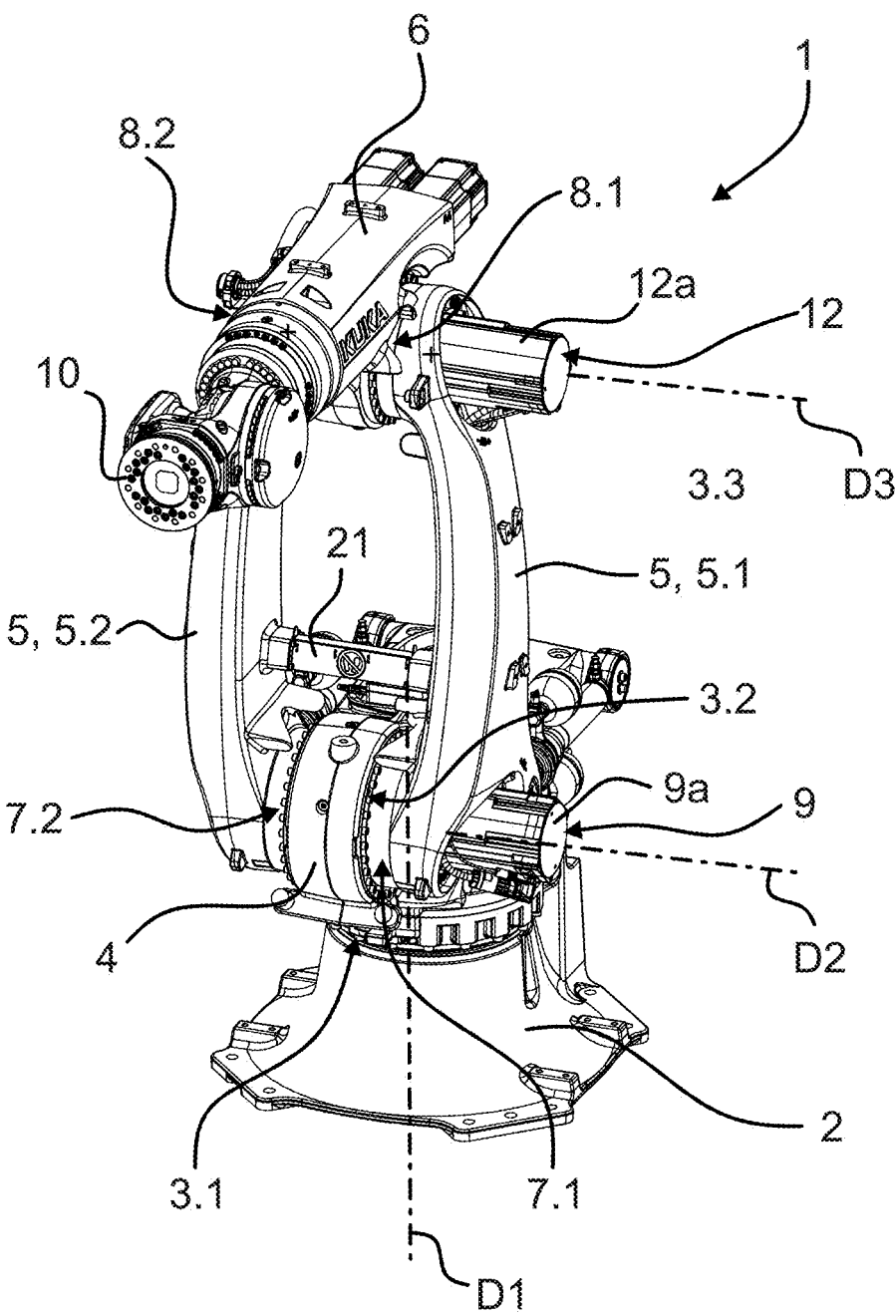
FIG. 1 shows a perspective view from the front of a first embodiment of a robot arm according to the present disclosure, with two pivot coupling rods and one drive each at the second joint and at the third joint.

FIG. 1 depicts a first embodiment of a robot arm 1 according to the present disclosure.

The robot arm 1 has a configuration with six configuration joints 3 in this exemplary first embodiment. The robot arm 1 comprises a base frame 2, a carousel 4 mounted on the base frame 2 such that it can rotate around a first axis of rotation D1 by means of a first joint 3.1 of the configuration joints 3, a link arm 5 mounted on the carousel 4 such that it can pivot around a second axis of rotation D2 by means of a second joint 3.2 of the configuration joints 3, and an arm boom 6 mounted on the link arm 5 such that it can pivot around a third axis of rotation D3 by means of a third joint 3.3 of the configuration joints 3.

According to the present disclosure, the pivot coupling rod 5 comprises two mechanically separate pivot coupling rods 5.1, 5.2 designed to position the third joint 3.3 in the working space of the robot arm 1, wherein the first pivot coupling rod 5.1 is pivotably mounted on the carousel 4 by means of a first base bearing 7.1 and the arm boom 6 is mounted on the first pivot coupling rod 5.1 by means of a first head bearing 8.1, and the second pivot coupling rod 5.2 is pivotably mounted on the carousel 4 by means of a second base bearing 7.2 and the arm boom 6 is mounted on the second pivot coupling rod 5.2 by means of a second head bearing 8.2.

The two pivot coupling rods 5.1, 5.2 are pivotably driven by a common drive apparatus 9 of the robot arm 1, which common drive apparatus 9 distributes the drive energy to be conducted via the link arm 5 for positioning the third joint 3.3 in the working space to the two pivot coupling rods 5.1, 5.2 in order to adjust the arm boom 6 relative to the carousel 4.

In the context of the present disclosure, the link arm 5 is understood to be the mechanical coupling link which transmits drive forces and drive torques for moving the arm boom 6 and absorbs load forces and load torques which are to be supported by the robot arm 1 due to the dead weight of the arm boom 6 and a further load attached to the arm boom 6.

The further load can in particular be a tool attached to a flange 10 of the robot arm 1, such as a gripper, and possibly an object gripped by the gripper, and/or an energy supply device 11 guided or mounted along the arm boom 6.

In this respect, the two pivot coupling rods 5.1 and 5.2 according to the present disclosure form a pair of coupling rods which, taken together, form the mechanical coupling link of the robot arm 1 which connects the second configuration joint 3.2 to the third configuration joint 3.3. The two pivot coupling rods 5.1, 5.2 are thus designed and set up to transmit the drive forces and drive torques for moving the arm boom 6 and to absorb load forces and load torques that are to be supported by the robot arm 1 due to the dead weight of the arm boom 6 and a further load attached to the arm boom 6. The drive energy required for this is conducted via both the first pivot coupling rod 5.1 and the second pivot coupling rod 5.2.

The first pivot coupling rod 5.1 and the second pivot coupling rod 5.2 are designed independently of one another. This means that the drive energy introduced into the first pivot coupling rod 5.1 cannot be passed on via the second pivot coupling rod 5.2 and, conversely, the drive energy introduced into the second pivot coupling rod 5.2 cannot be passed on via the first pivot coupling rod 5.1. Accordingly, the first pivot coupling rod 5.1 and the second pivot coupling rod 5.2 do not comprise a direct mechanical connection area, in particular no direct rigid connecting links. Accordingly, the first pivot coupling rod 5.1 and the second pivot coupling rod 5.2 are not designed in one piece, but are always mechanically separate from one another, in particular in two pieces.

The arm boom 6 is pivotably driven by a further drive apparatus 12 of the robot arm 1 on the link arm 5. The further drive apparatus 12 transmits its drive energy for positioning the arm boom 6 to the arm boom 6 in order to adjust the arm boom 6 relative to the link arm 5 and relative to the carousel 4.

Figure 4:
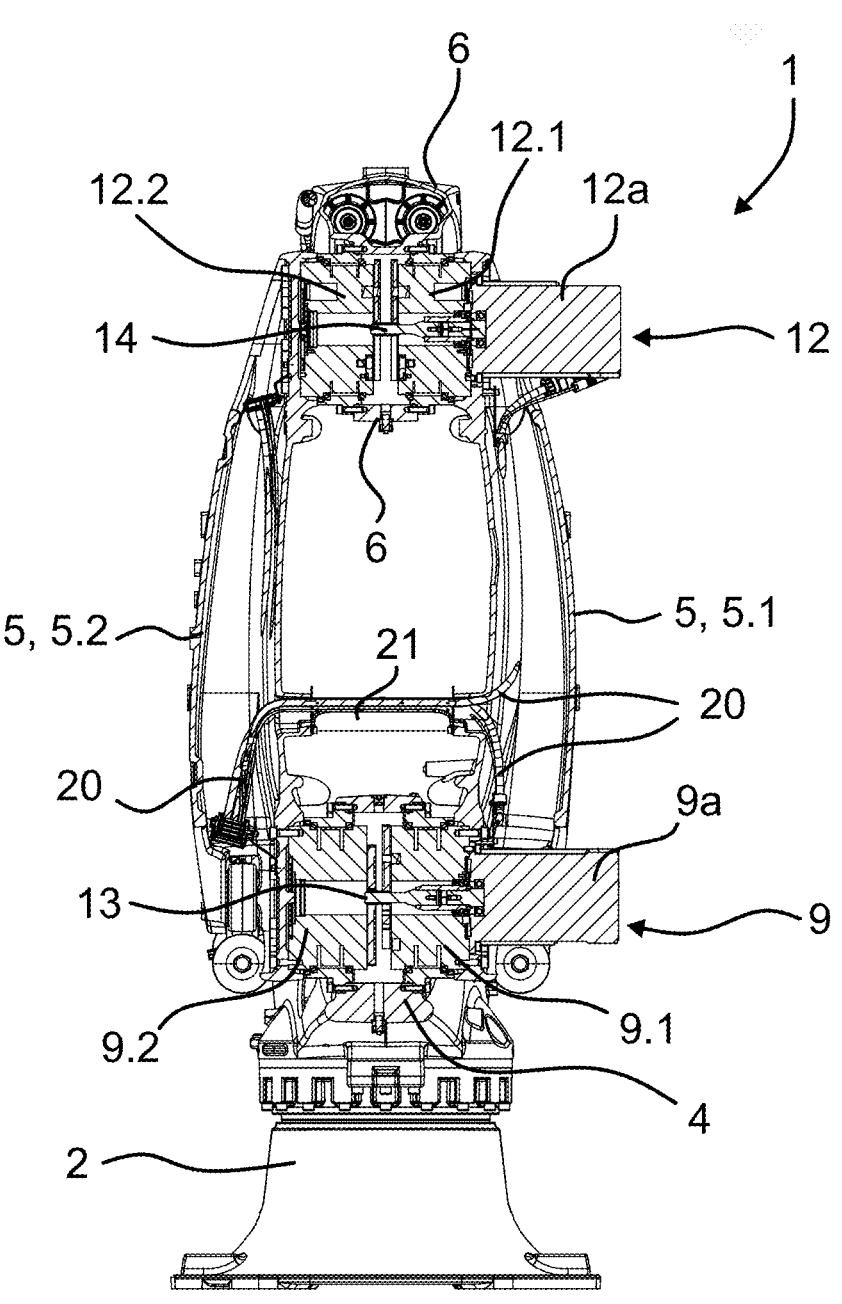
FIG. 4 shows a sectional view of the first embodiment of the robot arm according to FIG. 1.

As depicted in more detail in FIG. 4 in particular, the common drive apparatus 9 in this embodiment example comprises a first gear unit 9.1, which is designed to transmit part of the drive energy to the first pivot coupling rod 5.1, and a second gear unit 9.2, which is independent of the first gear unit 9.1 and is designed to transmit part of the drive energy to the second pivot coupling rod 5.2.

In this embodiment example, the further drive apparatus 12 also comprises a first pivot coupling rod gear unit 12.1, which is designed to transmit part of the drive energy to the arm boom 6, wherein the first pivot coupling rod gear unit 12.1 comprises a first torque support acting against the first pivot coupling rod 5.1. The further drive apparatus 12 also comprises a second pivot coupling rod gear unit 12.2, which is designed to transmit part of the drive energy to the arm boom 6, wherein the second pivot coupling rod gear unit 12.2 comprises a second torque support acting against the second pivot coupling rod 5.2.

In the case of the present embodiment example, the first gear unit 9.1 and the second gear unit 9.2 are mechanically coupled by means of at least one inter-gear stage 13. In this embodiment, the inter-gear stage 13 is merely a shaft which couples the first gear unit 9.1 and the second gear unit 9.2, in particular without the inter-gear stage 13 comprising a low-speed transmission ratio or a high-speed transmission ratio. In this respect, the inter-gear stage 13 can be a mere shaft. The shaft can be integrated into a motor shaft of a motor 9a or be formed in one piece with it.

In the same manner, the first pivot head gear unit 12.1 and the second pivot head gear unit 12.2 can be coupled, in particular mechanically coupled by means of at least one pivot head inter-gear stage 14. In the embodiment shown, the pivot head inter-gear stage 14 is merely a shaft which couples the first pivot head gear unit 12.1 and the second pivot head gear unit 12.2, in particular without the inter-gear stage 14 comprising a low-speed transmission ratio or a high-speed transmission ratio. In this respect, the inter-gear stage 14 can be a mere shaft. The shaft can be integrated into a motor shaft of a motor 12a or be formed in one piece with it.

As depicted in the embodiment according to FIG. 1 to FIG. 4, the common drive apparatus 9, in particular the first gear unit 9.1 and the second gear unit 9.2 may be driven by a single common motor 9a, and/or the further drive apparatus 12, in particular the first swinging head gear unit 12.1 and the second swinging head gear unit 12.2 may be driven by a common motor 12a.

Figure 5:
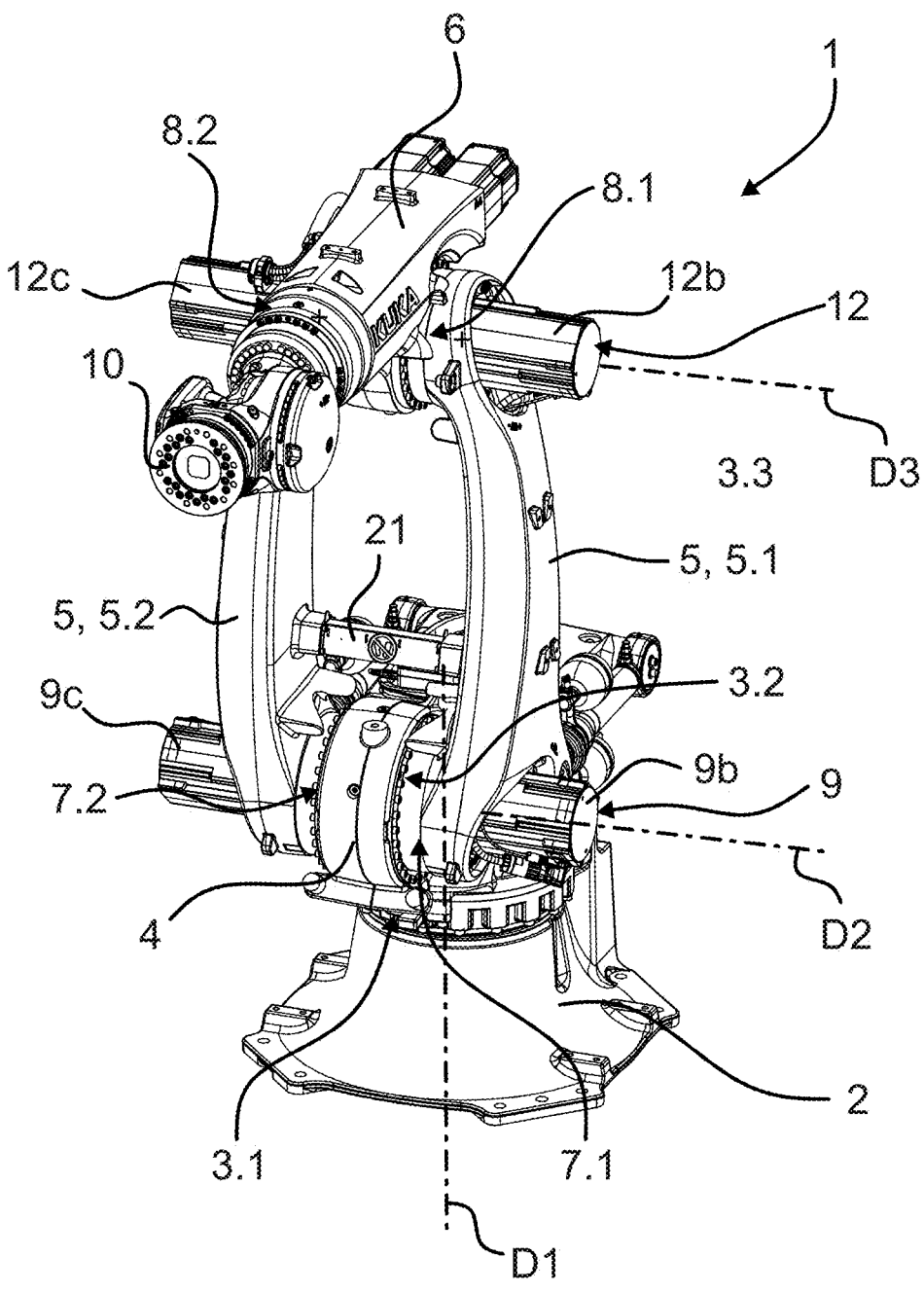
FIG. 5 shows a perspective view from the front of a second embodiment of a robot arm according to the present disclosure, with two pivot coupling rods and two drives each at the second joint and at the third joint.
Figure 6:
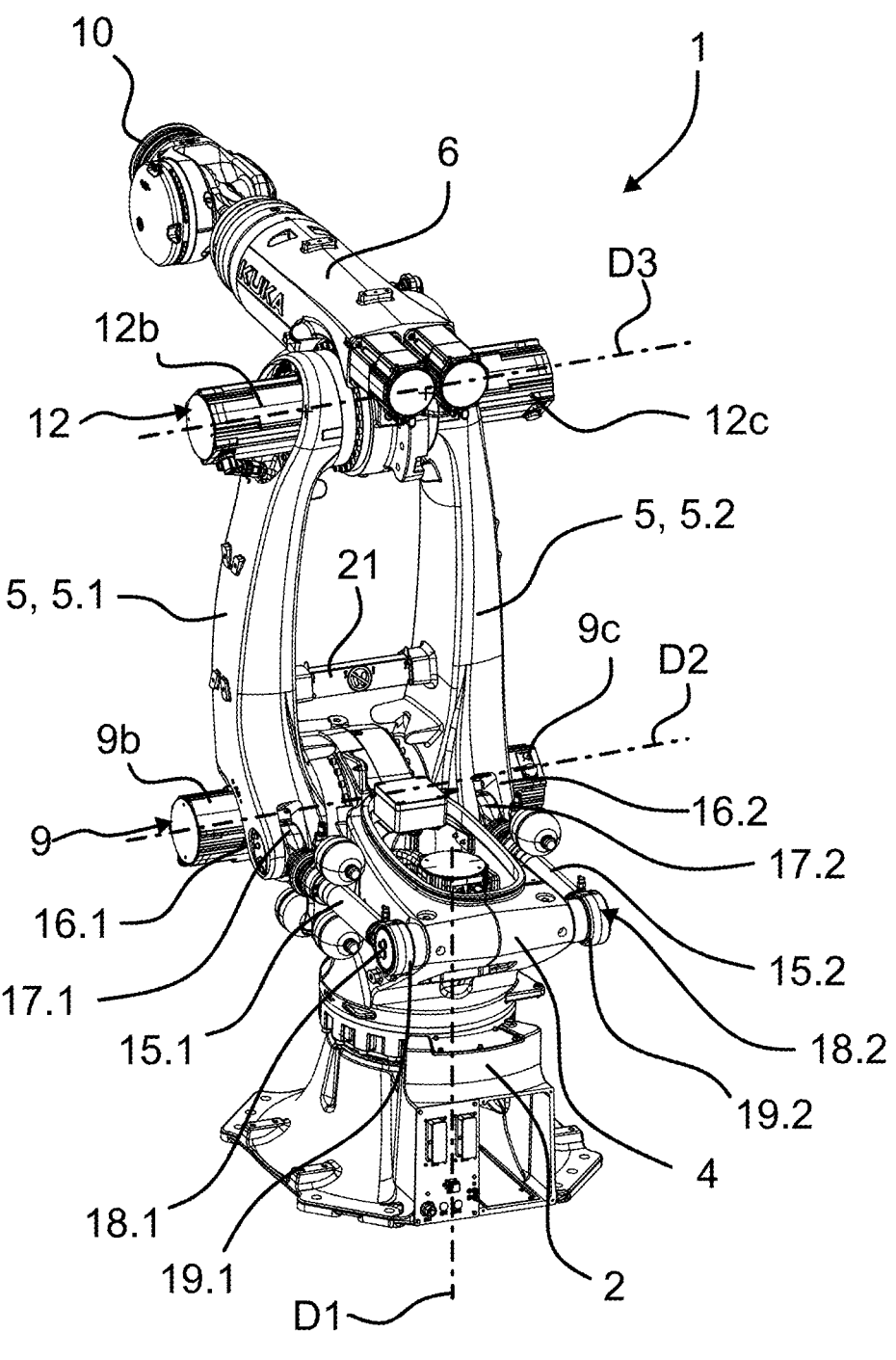
FIG. 6 shows a perspective view from behind of the second embodiment of the robot arm according to FIG. 5.
Figure 7:
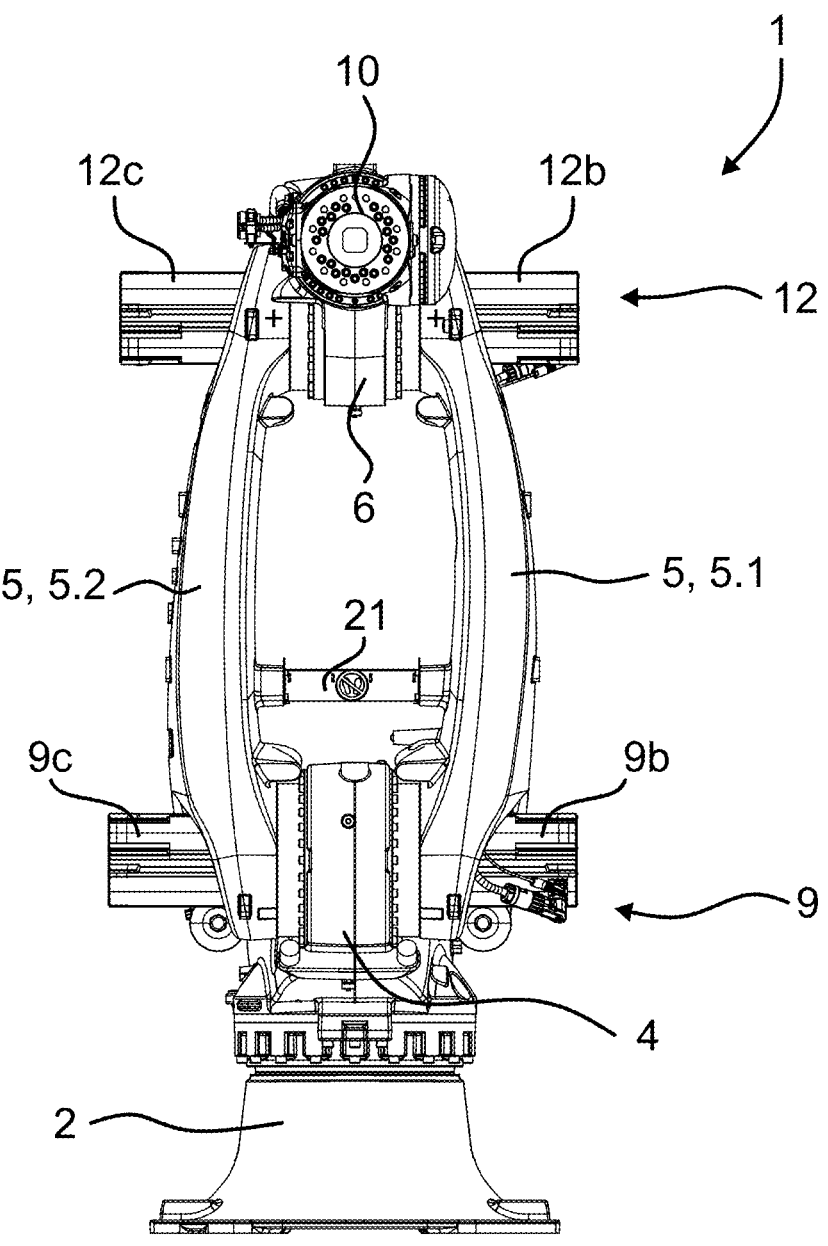
FIG. 7 shows a side view from the front of the second embodiment of the robot arm according to FIG. 5.

However, as depicted in the alternative embodiment according to FIG. 5 to FIG. 7, the common drive apparatus 9 can also be driven by two separate motors 9b and 9c, in particular the first gear unit 9.1 can be driven by a first motor 9*b* and the second gear unit 9.2 can be driven by a second motor 9*c*.

In the same manner, the further drive apparatus 12 can then also be driven by two separate motors 12*b* and 12*c*, in particular the first pivot head gear unit 12.1 can be driven by a first motor 12*b* and the second pivot head gear unit 12.2 can be driven by a second motor 12*c*.

The two motors 9*b* and 9*c* of the common drive apparatus 9 can then be actuated in a control-coupled manner; in particular, the first motor 9*b* of the first gear unit 9.1 and the second motor 9*c* of the second gear unit 9.2 can be actuated in a control-coupled manner.

Accordingly, the two motors 12*b* and 12*c* of the further drive apparatus 12 can also be actuated in a control-coupled manner, in particular the first motor 12*b* of the first pivot head gear unit 12.1 and the second motor 12*c* of the second pivot head gear unit 12.2 can be actuated in a control-coupled manner.

Figure 8:
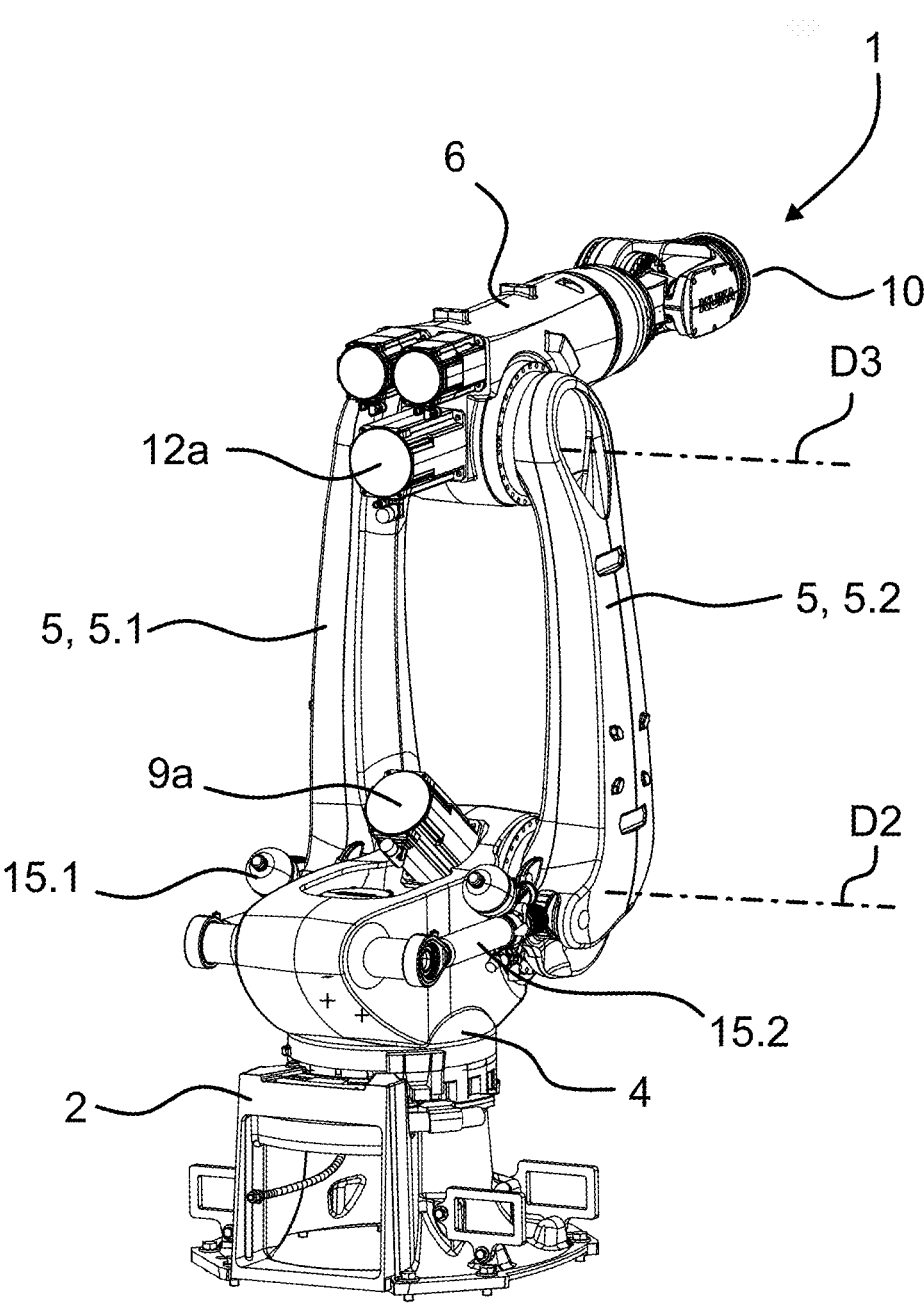
FIG. 8 shows a perspective view from the rear of a third embodiment of a robot arm according to the present disclosure, each with a drive positioned between the two pivot coupling rods, both at the second joint and at the third joint.

The common drive apparatus 9, in particular the first gear unit 9.1 and the second gear unit 9.2, can comprise at least one gearbox pre-stage, in particular at least one bevel gearbox pre-stage, in such a manner that the motor 9*a*, such as is depicted in FIG. 8, can be arranged with its motor shaft at right angles to the gearbox input shafts of the first gear unit 9.1 and the second gear unit 9.2 or at right angles to the axis of rotation D2.

In the same manner, the further drive apparatus 12, in particular the first swinging head gear unit 12.1 and the second swinging head gear unit 12.1 can comprise at least one gearbox pre-stage, in particular at least one bevel gearbox pre-stage, such that the motor 12*a*, as also depicted in FIG. 8, for example, can be arranged with its motor shaft at right angles to the gearbox input shafts of the first swinging head gear unit 12.1 and the second swinging head gear unit 12.2 or at right angles to the axis of rotation D3.

Figure 2:
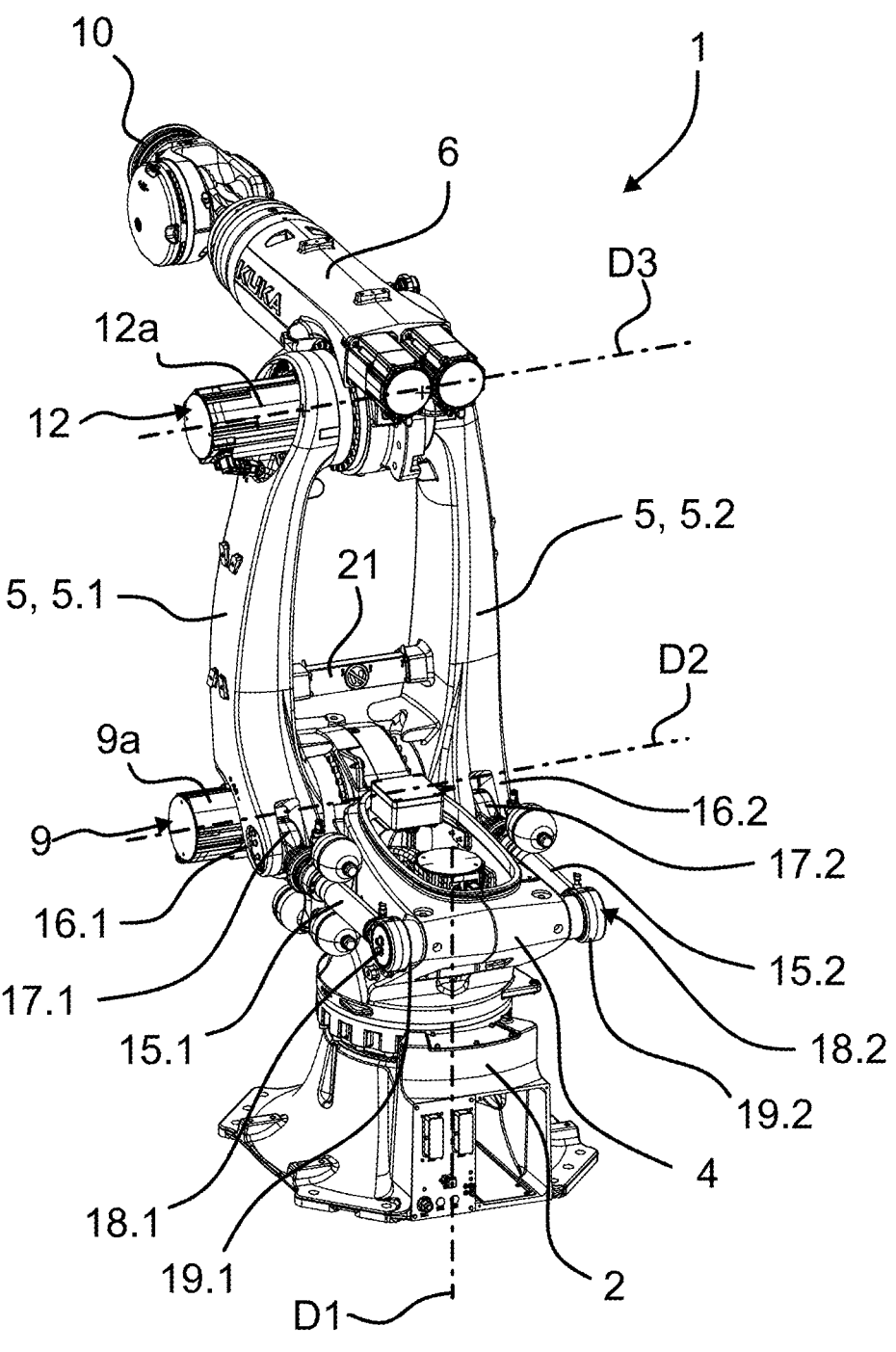
FIG. 2 shows a perspective view from behind of the first embodiment of the robot arm according to FIG. 1.
Figure 3:
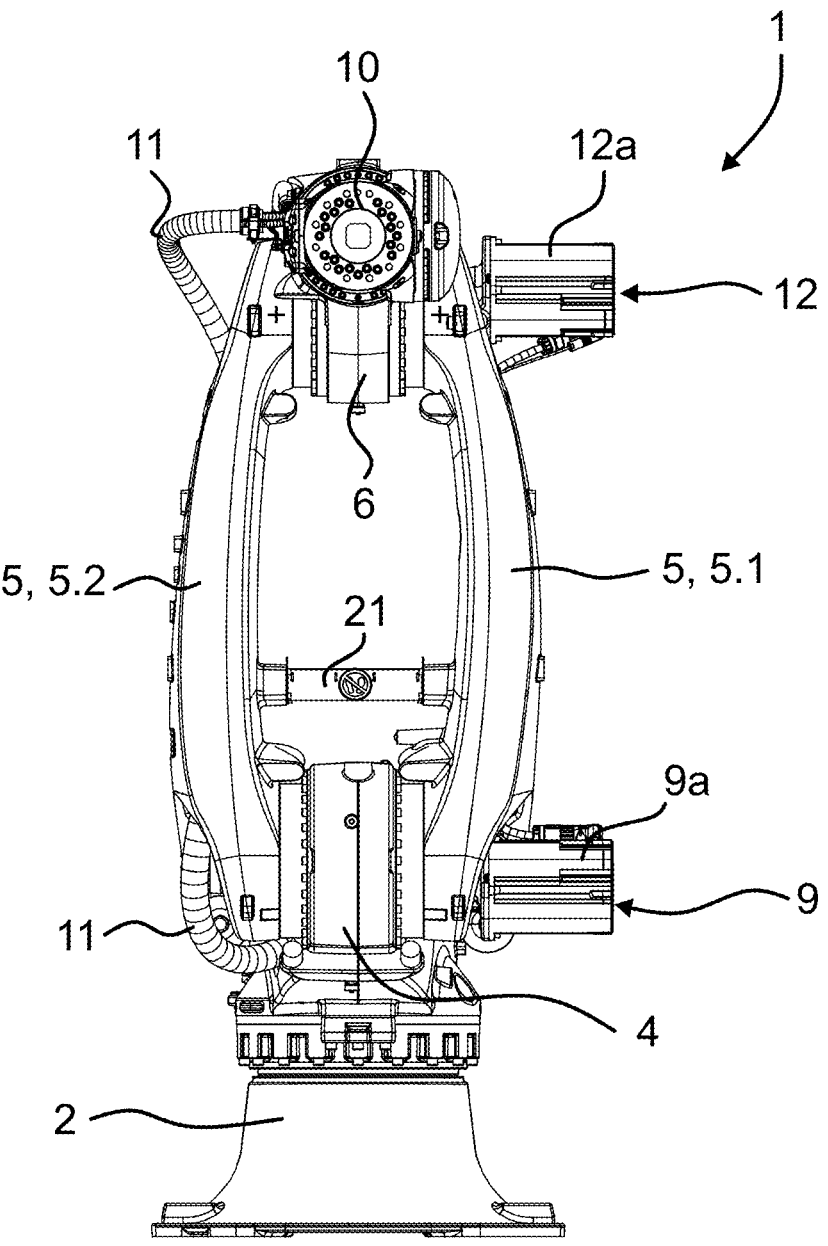
FIG. 3 shows a side view from the front of the first embodiment of the robot arm according to FIG. 1.

As can be clearly seen in FIG. 2 and FIG. 6 in particular, a first weight balancing device 15.1 of the robot arm 1 can be assigned to the first pivot coupling rod 5.1 and a second weight balancing device 15.2 of the robot arm 1 can be assigned to the second pivot coupling rod 5.2 separately from the first weight balancing device 15.1.

For this purpose, in the present embodiments, the first pivot coupling rod 5.1 comprises at least one first bearing eye 16.1 in the vicinity of its first base bearing 7.1 for coupling a front bearing head 17.1 of the first weight balancing device 15.1. In the same manner, the second pivot coupling rod 5.2 comprises at least one second bearing eye 16.2 in the vicinity of its second base bearing 7.2 for coupling a front bearing head 17.2 of the second weight balancing device 15.2. The rear bearing head 18.1 of the first weight balancing device 15.1 and the rear bearing head 18.2 of the second weight balancing device 15.2 are coupled to further bearing eyes 19.1 and 19.2 of the carousel 4 or are supported on these further bearing eyes 19.1 and 19.2 of the carousel 4. The first weight balancing device and the second weight balancing device can be designed identically.

A robot cable set 20 can be guided along the inside of the first pivot coupling rod 5.1, such as shown in FIG. 4. If necessary, a cable duct 21 can be arranged between the first pivot coupling rod 5.1 and the second pivot coupling rod 5.2, in which the robot cable set 20 is routed, for example near the carousel 4 of the robot arm 1, from the interior of the second pivot coupling rod 5.2 across the cable duct 21 into the interior of the first pivot coupling rod 5.1. The cable duct 21 can be made of plastic, for example, and is not designed to be able to transmit drive forces.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A robot arm, comprising:
   a plurality of configuration joints determining the configuration of the robot arm, a base frame, a carousel rotatably mounted on the base frame around a first axis of rotation by a first joint of the configuration joints, a link arm pivotably mounted on the carousel around a second axis of rotation by a second joint of the configuration joints, and an arm boom pivotably mounted on the link arm around a third axis of rotation by a third joint of the configuration joints;
   wherein the link arm comprises mechanically separate first and second pivot coupling rods designed to position the third joint in a working space of the robot arm;
   the first pivot coupling rod pivotably mounted on the carousel by a first base bearing;
   the second pivot coupling rod pivotably mounted on the carousel by a second base bearing;
   the arm boom pivotably mounted on the first pivot coupling rod by a first head bearing;
   the arm boom mounted on the second pivot coupling rod by a second head bearing; and
   a first drive apparatus configured and arranged to pivotably drive the first and second pivot coupling rods, whereby the first drive apparatus distributes drive energy to be conducted via the link arm for positioning the third joint in the working space to the two pivot coupling rods in order to adjust the arm boom relative to the carousel.

2. The robot arm of claim 1, further comprising:
   a second drive apparatus configured to pivotably drive the arm boom on the link arm by transmitting drive energy to the arm boom, thereby adjusting the arm boom relative to the link arm.

3. The robot arm of claim 1, wherein at least one of:
   the first drive apparatus comprises:
      a first gear unit designed to transmit part of the drive energy to the first pivot coupling rod, and
      a second gear unit independent of the first gear unit and designed to transmit part of the drive energy to the second pivot coupling rod; or
   the second drive apparatus comprises:
      a first swivel head gear unit designed to transmit part of the drive energy to the arm boom, wherein the first swivel head gear unit comprises a first torque support member acting against the first pivot coupling rod, and
      a second swivel head gear-unit designed to transmit part of the drive energy to the arm boom, wherein the second swivel head gear unit comprises a second torque support member acting against the second pivot coupling rod.

4. The robot arm of claim 3, wherein at least one of:

the first gear unit and the second gear unit are operatively coupled together; or the first swivel head gear unit and the second swivel head gear unit are operatively coupled together.

5. The robot arm of claim 4, wherein:

the first gear unit and the second gear unit are mechanically coupled by at least one intermediate gear stage; or the first swivel head gear unit and the second swivel head gear unit are mechanically coupled by at least one swivel head intermediate gear stage.

6. The robot arm of claim 3, wherein at least one of:

the first gear unit and the second gear unit of the first drive apparatus are driven by a common motor; or the first swivel head gear unit and the second swivel head gear unit of the second drive apparatus are driven by a common motor.

7. The robot arm of claim 3, wherein at least one of:

the first gear unit of the first drive apparatus is driven by a first motor, and the second gear unit of the first drive apparatus is driven by a second motor that is separate from the first motor; or the first swivel head gear unit of the second drive apparatus is driven by a third motor, and the second swivel head gear unit of the second drive apparatus is driven by a fourth motor that is separate from the third motor.

8. The robot arm of claim 7, wherein at least one of:

the first motor and the second motor are actuated in a control-coupled manner; or the third motor and the fourth motor are actuated in a control-coupled manner.

9. The robot arm of claim 2, wherein at least one of:

the first drive apparatus comprises at least one pre-stage gearbox; or the second drive apparatus comprises at least one pre-stage gearbox.

10. The robot arm of claim 9, wherein the at least one pre-stage gearbox of the first drive apparatus or the second drive apparatus comprises at least one pre-stage bevel gearbox.

11. A robot arm, comprising:

a plurality of configuration joints determining the configuration of the robot arm, a base frame, a carousel rotatably mounted on the base frame around a first axis of rotation by a first joint of the configuration joints, a link arm pivotably mounted on the carousel around a second axis of rotation by a second joint of the configuration joints, and an arm boom pivotably mounted on the link arm around a third axis of rotation by a third joint of the configuration joints;

wherein the link arm comprises mechanically separate first and second pivot coupling rods designed to position the third joint in a working space of the robot arm;

the first pivot coupling rod pivotably mounted on the carousel by a first base bearing;

the second pivot coupling rod pivotably mounted on the carousel by a second base bearing;

the arm boom pivotably mounted on the first pivot coupling rod by a first head bearing;

the arm boom mounted on the second pivot coupling rod by a second head bearing;

a first drive apparatus configured and arranged to pivotably drive the first and second pivot coupling rods, whereby the first drive apparatus distributes drive energy to be conducted via the link arm for positioning the third joint in the working space to the two pivot coupling rods in order to adjust the arm boom relative to the carousel;

a second drive apparatus configured to pivotably drive the arm boom on the link arm by transmitting drive energy to the arm boom, thereby adjusting the arm boom relative to the link arm;

wherein at least one of:

the first drive apparatus comprises at least one pre-stage gearbox, or the second drive apparatus comprises at least one pre-stage gearbox; wherein:

the first drive apparatus comprises:

a first gear unit designed to transmit part of the drive energy to the first pivot coupling rod, and a second gear unit independent of the first gear unit and designed to transmit part of the drive energy to the second pivot coupling rod, wherein the first gear unit and the second gear unit are operatively coupled with the at least one pre-stage gearbox; or the second drive apparatus comprises:

a first swivel head gear unit designed to transmit part of the drive energy to the arm boom, and a second swivel head gear-unit designed to transmit part of the drive energy to the arm boom, wherein the first swivel head gear unit and the second swivel head gear unit are operatively coupled with the at least one pre-stage gearbox.

12. The robot arm of claim 1, further comprising:

a first weight balancing device assigned to the first pivot coupling rod; and a second weight balancing device, which is separate from the first weight balancing device, assigned to the second pivot coupling rod.

13. The robot arm of claim 1, further comprising:

a robot cable set guided along the first pivot coupling rod; and an energy supply line guided along the second pivot coupling rod.

\* \* \* \* \*